Jan. 12, 1960 W. V. HAGBERG 2,920,857
WINDOW HOLDING RACK
Filed Jan. 4, 1957
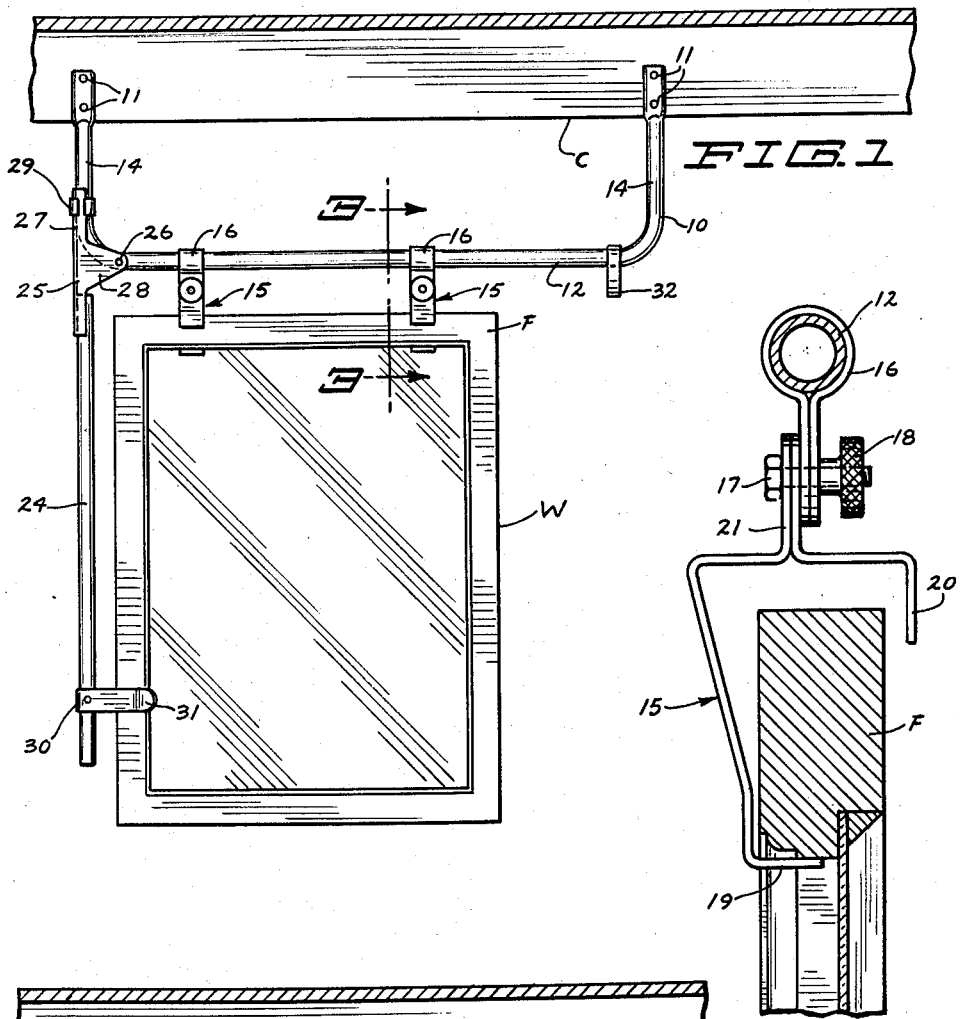
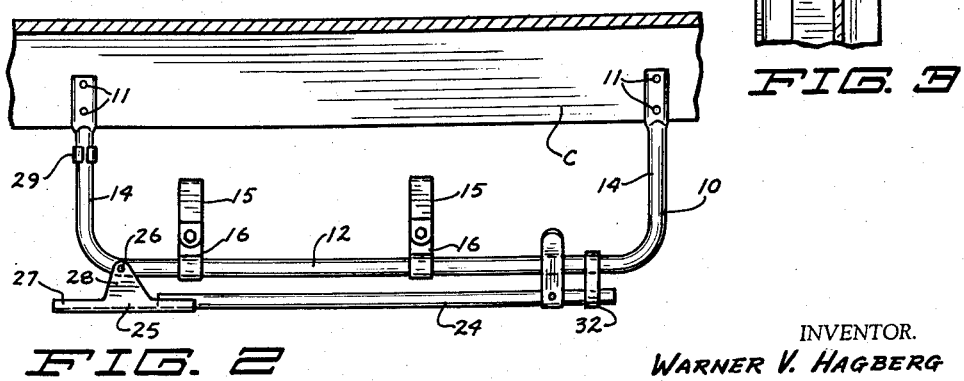
INVENTOR.
WARNER V. HAGBERG
BY
ATTORNEYS

2,920,857
WINDOW HOLDING RACK

Warner V. Hagberg, Minneapolis, Minn.

Application January 4, 1957, Serial No. 632,488

3 Claims. (Cl. 248—317)

This invention relates generally to a rack for holding storm windows, screens or the like while they are being painted, washed or otherwise worked upon and more particularly concerns such a rack which is collapsible to an out of the way position when not in use.

The primary object of the invention is to provide a rack for securely holding a storm window or the like in an elevated vertical position while it is being worked upon.

Another object of the invention is to provide a window holding rack adapted to be mounted on an overhead support and which has means for retaining the lower portion of a window suspended from the rack against swinging, and wherein the said retaining means is collapsible upwardly against the rack to an out of the way position.

Still another object of the invention is to provide a collapsible window holding rack which is economical to manufacture, durable, and extremely simple to mount in a permanent operative positon.

With the above mentioned objectives in mind my invention broadly comprises a support bracket adapted to be mounted in an elevated position and having horizontally spaced window grips for securing the top marginal edge of a window, a bar depending from the support and having means for engaging around a side edge of the window at a point spaced substantially below the top edge of the window, said bar being pivoted to the support for upward folding movement to a collapsed position against the support, and means for locking the bar in its collapsed position.

The above mentioned and still additional objects of the invention will be brought to light during the course of the following specification, reference being made to the accompanying drawings, in which—

Fig. 1 is a front elevation of the rack in mounted and open condition supporting a storm window in position to be worked upon.

Fig. 2 is a front elevation of the device in collapsed condition.

Fig. 3 is an enlarged fragmentary sectional view of one of the window grips or hanger elements taken on line 3—3 of Fig. 1.

Referring now more particularly to the drawing reference numerals will be used to denote like parts or structural features in the different views. The letter C designates generally an elevated support such as a structural ceiling having horizontal rafters. A window suspension element or bracket 10 of tubular construction is attached to the support C as by screws 11. This bracket, in the preferred embodiment, is U-shaped with a central elongated straight portion 12 having parallel mounting arms 14 at either end with the distal ends of the arms attached to the support. The bracket is mounted so that the portion 12 is horizontal and spaced substantially above the ground or floor of the structure presenting the support C.

Mounted on the bracket 10 and spaced along the horizontal portion 12 thereof are a pair of hangers 15. These hangers are mounted by metal loops 16 which extend around the portion 12 and which are releasably secured to the hangers by bolts 17 which carry knurled nuts 18.

Each element 15 is designed to partially encircle and releasably grip the frame F of a window W by presenting a horizontally extending ledge 19 (Fig. 3) for engaging under the frame and a retainer portion 20 for prohibiting horizontal displacement of the frame from the ledge 19. Member 15 has an upright portion 21 which is apertured for reception of the bolt 17.

The hangers 15 are adjustably spaced along the horizontal portion 12 of the bracket 10. When the window frame F along one edge of the window is inserted into the hangers the window will obviously hang therefrom in a vertical position as shown in Fig. 1. The frame portion gripped is held in horizontal position inasmuch as the hangers 15 are at equal elevations.

I have provided a means for retaining the window W in its vertical position despite sideward pressure applied to a face thereof such as necessarily occurs during washing or painting of the window. An elongated arm or bracket extension 24 is fixed to a hinge 25 which is pivoted as at 26 to the bracket 10. Hinge 25 is of channel shape with one end portion rigidly connected to the arm 24 and the opposite end portion 27 adapted to fit against the outer side of leg 14 of the bracket. Parallel hinge ears 28 project inwardly on opposite sides of bracket portion 12 for reception of the pivot pin 26. Accordingly the arm 24 is adapted for swinging movement about the pivot 26 between an open position depending from the bracket (Fig. 1) and a closed position against the bracket (Fig. 2). When the arm is open it will depend vertically in alignment with the adjacent portion 14 of the bracket 10, and at right angles to the horizontal portion 12. The hinge portion 27 serves as a stop to limit opening movement of the arm. A split ring collar 29 is provided on the bracket leg 14 for sliding over and around the hinge portion 27 to lock the arm 24 in open position.

A clip or keeper 30 is integrally mounted on the arm near the lower end thereof or at a point spaced substantially outward from the pivot point 26. This keeper is preferably a U-shaped element with the legs 31 thereof projecting inwardly below the bracket 10 and spaced apart a sufficient distance to snugly receive the frame F therebetween. Only one leg 31 is shown in the drawing, but it will be understood that the other leg projects along the rear side of the frame F in Fig. 1.

The loops 16 fit rather snugly around the bar 12 so as to frictionally resist sliding or turning movement on the bar. They may, however, be forcefully rotated on the bar to enable the hangers 15 to be flipped up to an upwardly projecting position as shown in Fig. 2. If it is necessary to open the loops somewhat to facilitate variance in the spacing between the hangers 15, the nuts 18 may be loosened.

The means of using the invention will now be readily understood. With the device mounted on an elevated support as shown in Figs. 1 and 2, the arm 24 is allowed to swing downwardly to its extended or vertical position and locked in place by the collar 29. The window W to be worked upon is then hung upon the device by inserting one side of the frame thereof into the hangers 15 so that the window is suspended on a vertical plane. The window is then moved sideways with the top frame portion sliding through the hangers 15 until the side or vertical portion of the frame F is moved into the keeper 30. The window W is now securely held so as to withstand pressure exerted against the front or back faces thereof. When so held in an elevated position the window may be conveniently worked upon.

It may be desirable to collapse the rack to an out of the way position when it is not in use. This is simply and quickly accomplished by swinging the hangers 15 to an upwardly extending position about the horizontal bar 12, lifting collar 24 to release the arm 24 and swinging the arm upwardly to a collapsed position along the underside of the bracket bar 12. The keeper legs 31 will straddle bar 12.

The legs 31 of clip keeper 30 may be formed with facing recesses and may be spring biased in a relatively closing direction enabling the legs 31 to securely grip the portion 12 to hold the arm 24 in closed position. However, for more positive locking I have provided a ring 32 on the bracket which may be moved over the distal end of the folded arm 24.

The importance of the arm 24 and its carried clip or keeper 30 should be clearly understood. While the hangers 15 will securely suspend the window in the desired elevated position their engagement with the window frame must be sufficiently loose or open to allow a plurality of windows to be successively inserted and removed therefrom without the need of tightening the hanger grip. Accordingly, when a window is so suspended it must be restrained against movement about the axis of suspension. The keeper 30 fully solves this problem by engaging the front and back surfaces of the window frame at a place spaced substantially below the horizontal line of suspension.

I have accordingly provided a window holding rack which economically and effectively carries out the aforementioned objectives. It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a window holding rack, a bracket, screw means on the bracket for securing the bracket in elevated position to a ceiling structure, the bracket having hanger means thereon configured to releasably engage around and grip the frame of a conventional wood frame storm window for hanging the window in upright position from the bracket, an elongated bracket extension member having one end portion pivotally connected to the bracket at one side of the hanger means for opening and closing swinging movement of the member between a vertically depending open position and a horizontal closed position against the bracket, and a singular window keeper device rigidly mounted on the bracket extension member near its extended end for gripping the side edge of a window hanging from the bracket.

2. The subject matter of claim 1 wherein there is a retention means mounted on the bracket at a point remote from the pivotal connection for engaging under and retaining the extension member in closed position, and said means being movable on the bracket between extension member engaging and releasing positions.

3. In a window holding rack, a U-shaped mounting bracket having a straight central bight portion connecting a pair of parallel mounting arms all lying on a common plane, screw means on said mounting arms for securing the bracket to an elevated support with the bight portion extending horizontally, a pair of hangers mounted on said bight portion in horizontally spaced relation and formed to releasably grip the frame of a storm window to hold the window in swingable suspended position from the bracket in the plane of the bracket, a bracket extension arm, a hinge device on one end of the extension arm having a pivotal connection with the bracket adjacent the connection between the bight portion and one mounting arm of the bracket, the axis of said pivot being perpendicular to the said bracket plane for movement of the extension arm along said plane between a collapsed position against the underside of said bight portion and an open position depending vertically therefrom, a stop on the hinge device engageable with the bracket to limit opening movement of the extension arm to said vertical position, a releasable locking device on the bracket for locking the hinge to prohibit folding movement of the arm to its collapsed position, a keeper means rigidly mounted on the arm at a point remote from the hinge device, said keeper means having a pair of generally parallel projections extending inwardly under the bracket bight portion, one on each side of said plane, and so spaced as to snugly hold the window frame therebetween to prohibit swinging of the window.

References Cited in the file of this patent

UNITED STATES PATENTS

| | | |
|---|---|---|
| 975,114 | Blank | Nov. 8, 1910 |
| 2,019,595 | Black | Nov. 5, 1935 |
| 2,340,540 | Longe | Feb. 1, 1944 |
| 2,744,712 | Brandt | May 8, 1956 |